United States Patent
Chittiprolu et al.

(10) Patent No.: US 10,754,982 B1
(45) Date of Patent: Aug. 25, 2020

(54) SYSTEM AND METHOD FOR SCRUBBING DATA TO BE SHARED BETWEEN ORGANIZATIONS

(71) Applicant: State Farm Mutual Automobile Insurance Company, Bloomington, IL (US)

(72) Inventors: Murali Chittiprolu, Normal, IL (US); George Ross Lewis, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 141 days.

(21) Appl. No.: 15/435,478

(22) Filed: Feb. 17, 2017

Related U.S. Application Data

(60) Provisional application No. 62/308,276, filed on Mar. 15, 2016, provisional application No. 62/298,556, filed on Feb. 23, 2016.

(51) Int. Cl.
*G06F 21/62* (2013.01)
*G06F 11/36* (2006.01)

(52) U.S. Cl.
CPC ...... *G06F 21/6254* (2013.01); *G06F 11/3672* (2013.01)

(58) Field of Classification Search
CPC .......... G06F 21/6254; G06F 11/3672
USPC ........................................... 726/26
See application file for complete search history.

(56) References Cited

U.S. PATENT DOCUMENTS

| | | |
|---|---|---|
| 9,141,659 B1 * | 9/2015 | Middleman ....... G06F 17/30371 |
| 9,239,777 B1 * | 1/2016 | Cohen ................. G06F 11/3684 |
| 2015/0213288 A1 * | 7/2015 | Bilodeau ............. G06F 21/6245 726/26 |

* cited by examiner

*Primary Examiner* — Brandon S Hoffman
*Assistant Examiner* — Nega Woldemariam
(74) *Attorney, Agent, or Firm* — Faegre Drinker Biddle & Reath LLP

(57) ABSTRACT

A system and method for scrubbing data to be shared between organizations to test a joint solution, and for preventing the introduction of unscrubbed data. Each organization captures a subset of data, which may be customer data from a line of business. The first organization scrubs its data according to scrubbing rules, and then passes the scrubbed data to its test environment, while the second organization passes its unscrubbed data to its test environment. The scrubbed data is communicated to the second organization and is applied to the unscrubbed data in order to scrub it, and then communicate it to the first organization. Both organizations use the scrubbed data in their respective test environments to test the joint solution or joint testing. Scrubbing the data may involve scrubbing only specific data fields containing sensitive information.

17 Claims, 3 Drawing Sheets

SYSTEM AND METHOD FOR SCRUBBING DATA TO BE SHARED BETWEEN ORGANIZATIONS

RELATED APPLICATION

The present U.S. non-provisional patent application is related to and claims priority benefit of a first prior-filed U.S. provisional patent application having the same title, Ser. No. 62/308,276, filed Mar. 15, 2016, and a second prior-filed U.S. provisional patent application having the same title, Ser. No. 62/298,556, filed Feb. 23, 2016. The entire contents of the identified earlier-filed patent applications are hereby incorporated by reference into the present patent application.

FIELD OF THE DISCLOSURE

The present disclosure generally relates to systems and methods for scrubbing organizations' data of sensitive information prior to exchanging it or otherwise making it externally available, such as when conducting joint testing or other actions, and to prevent the introduction of unscrubbed data into the organizations.

BACKGROUND

Organizations sometimes conduct joint actions, such as testing organizational products, services, or other solutions, which require an exchange of data and maintenance of common data that is sourced, updated, and used by both organizations. In such situations, it may be desirable for an organization to scrub its data of sensitive information prior to making it externally available, and to prevent the introduction of unscrubbed data into the organization. However, each organization involved in the joint action may have its own process for scrubbing its own data, and these processes may be incompatible to varying degrees. Further, some needs may require scrubbed data while other needs may require unscrubbed data. For example, a simulation operation may require one organization to provide another with unscrubbed data for a line of business being tested, a conversion operation may require the organization to provide a test environment with unscrubbed data for the line of business, and an integration operation may require the organization to provide the test environment with scrubbed data while still maintaining the integrity of the common data.

BRIEF SUMMARY

Embodiments of the present technology relate to systems and computer-implemented methods for scrubbing organizations' data of sensitive information prior to exchanging it or otherwise making it externally available, such as when conducting joint testing or other actions, and to prevent the introduction of unscrubbed data from the second organization. Broadly characterized, one organization's data may be scrubbed using the other organization's actual scrubbed data in test, rather than the other organization's scrubbing rules or process.

In a first aspect, a system may be provided for scrubbing data to be shared between a first organization and a second organization for testing a joint solution, wherein the first organization may produce a first data set and the second organization may produce a second data set, and the system may broadly comprise the following. A first electronic memory may be configured to capture a first data subset of the first data set, a first electronic processor may be configured to scrub the first data subset according to scrubbing rules, and a first electronic communication element may be configured to communicate via an electronic communication network the scrubbed first data subset from the first organization to the second organization. A second electronic memory may be configured to capture a second data subset of the second data set, a second electronic processor may be configured to apply the scrubbed first data subset to the unscrubbed second data subset in order to scrub the second data subset, and a second electronic communication element may be configured to communicate via the electronic communication network at least part of the scrubbed second data subset from the second organization to the first organization as part of testing the joint solution or as part of joint testing. The scrubbed first and second data subsets may be used in a first test environment provided by the first organization to test the joint solution, and the scrubbed first and second data subsets may be used in a second test environment provided by the second test environment to test the joint solution.

Additionally or alternatively, (a) the scrubbed first and second data subsets may be used in a first test environment provided by the first organization to test the joint solution and in a second test environment provided by the second test environment to test the joint solution, respectively, or (b) the scrubbed first and second data subsets may be used in a joint or shared test environment that is accessible by both the first and second organizations while testing is ongoing. The computer system may include additional, less, or alternate functionality, including that discussed elsewhere herein.

In a second aspect, a computer-implemented method may be provided for scrubbing data to be shared between a first organization and a second organization for testing a joint solution, wherein the first organization may produce a first data set and the second organization may produce a second data set, and the computer-implemented method may broadly comprise the following. A first data subset of the first data set may be captured in a first electronic memory, and a second data subset of the second data set may be captured in a second electronic memory. The first data subset may be scrubbed according to scrubbing rules by a first electronic processor. The scrubbed first data subset may be communicated from the first organization to the second organization by a first electronic communication element and via an electronic communication network. The scrubbed first data subset may be applied to the unscrubbed second data subset by a second electronic processor in order to scrub the second data subset. At least part of the scrubbed second data subset may be communicated from the second organization to the first organization by a second electronic communication element via the electronic communication network as part of testing the joint solution (or part of joint testing). The scrubbed first and second data subsets may be used in a first test environment provided by the first organization and in a second test environment provided by the second organization to test the joint solution, or the scrubbed first and second data subsets may be used in a joint or shared test environment that is accessible by both the first and second organization during testing. The method may include additional, less, or alternate actions, including those discussed herein, and may be implemented via one or more processors and/or computer-executable instructions stored on non-transitory computer-readable medium or media.

In a third aspect, a non-transitory computer-readable medium with an executable program stored thereon may be provided for scrubbing data to be shared between a first organization and a second organization for testing a joint solution, wherein the first organization may produce a first data set and the second organization may produce a second data set, wherein the computer program may be configured to instruct a system to perform the following actions. A first data subset of the first data set may be captured in a first electronic memory, and a second data subset of the second data set may be captured in a second electronic memory. The first data subset may be scrubbed according to scrubbing rules by a first electronic processor. The scrubbed first data subset may be communicated from the first organization to the second organization by a first electronic communication element and via an electronic communication network. The scrubbed first data subset may be applied to the unscrubbed second data subset by a second electronic processor in order to scrub the second data subset. At least part of the scrubbed second data subset may be communicated from the second organization to the first organization by a second electronic communication element via the electronic communication network as part of joint testing and/or testing the joint solution. The scrubbed first and second data subsets may be used in a first test environment provided by the first organization and in a second test environment provided by the second organization to test the joint solution. The instructions may direct additional, less, or alternate functionality, including that discussed elsewhere herein.

Various implementations of any or all of the foregoing aspects may include any one or more of the following additional features. The data may be customer data associated with a business endeavor. Scrubbing the first data subset may involve scrubbing only one or more specific data fields, which may contain sensitive information. The specific data fields may include any one or more of account numbers, dates of birth, vehicle identification numbers, telephone numbers, addresses, social security numbers, and personal identification numbers. Scrubbing the specific data fields may include preserving a format of each of the specific data fields. Scrubbing the specific data fields may include preserving one or more characters which are relevant to testing the joint solution while replacing other characters in the specific data fields. The process may further include creating by the first organization an additional control at a data integration point to identify and prevent the introduction of unscrubbed data from the second organization.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for scrubbing organizations' data of sensitive information prior to exchanging it or otherwise making it externally available, such as when conducting joint testing or other actions, and to prevent the introduction of unscrubbed data into the organizations. For example, the present invention may be used to manage differences in data scrubbing between organizations involved in integration testing tightly integrated solutions. Broadly characterized, one organization's data may be scrubbed using the other organization's actual scrubbed data in test, rather than the other organization's scrubbing rules or process.

In various embodiments, each organization may capture a subset of data, which may be customer data from a line of business. The first organization may scrub its first data subset according to scrubbing rules, and may pass the scrubbed first data subset to its test environment, while the second organization may pass its unscrubbed second data subset to its test environment. The scrubbed first data subset may be communicated to the second organization and may be applied to the unscrubbed second data subset in order to scrub it. The scrubbed second data subset may be communicated to the first organization, and both organizations may use the scrubbed data subsets in their test environments to test the joint solution. Scrubbing the data subsets may involve scrubbing only specific data fields containing sensitive information.

The present invention may therefore offer numerous benefits over the prior art, including providing a significantly lower cost solution to develop, implement, and maintain compared to other enterprise options for managing the exchange of data between organizations.

I. Exemplary System

Figure 1:
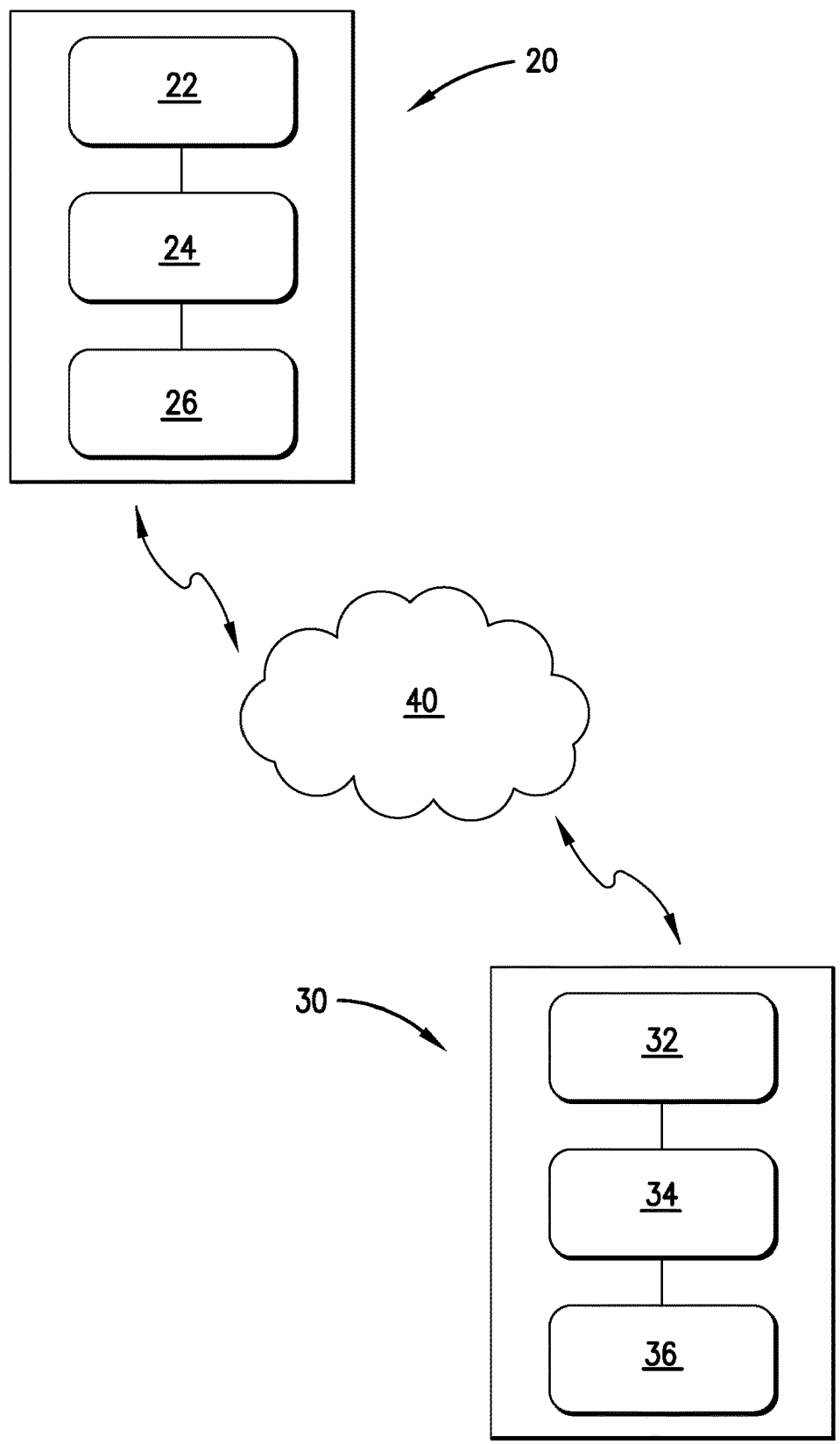
FIG. 1 is a depiction of exemplary computing resources for implementing a system and method for scrubbing data to be shared between organizations and for preventing the introduction of unscrubbed data.
Figure 2:
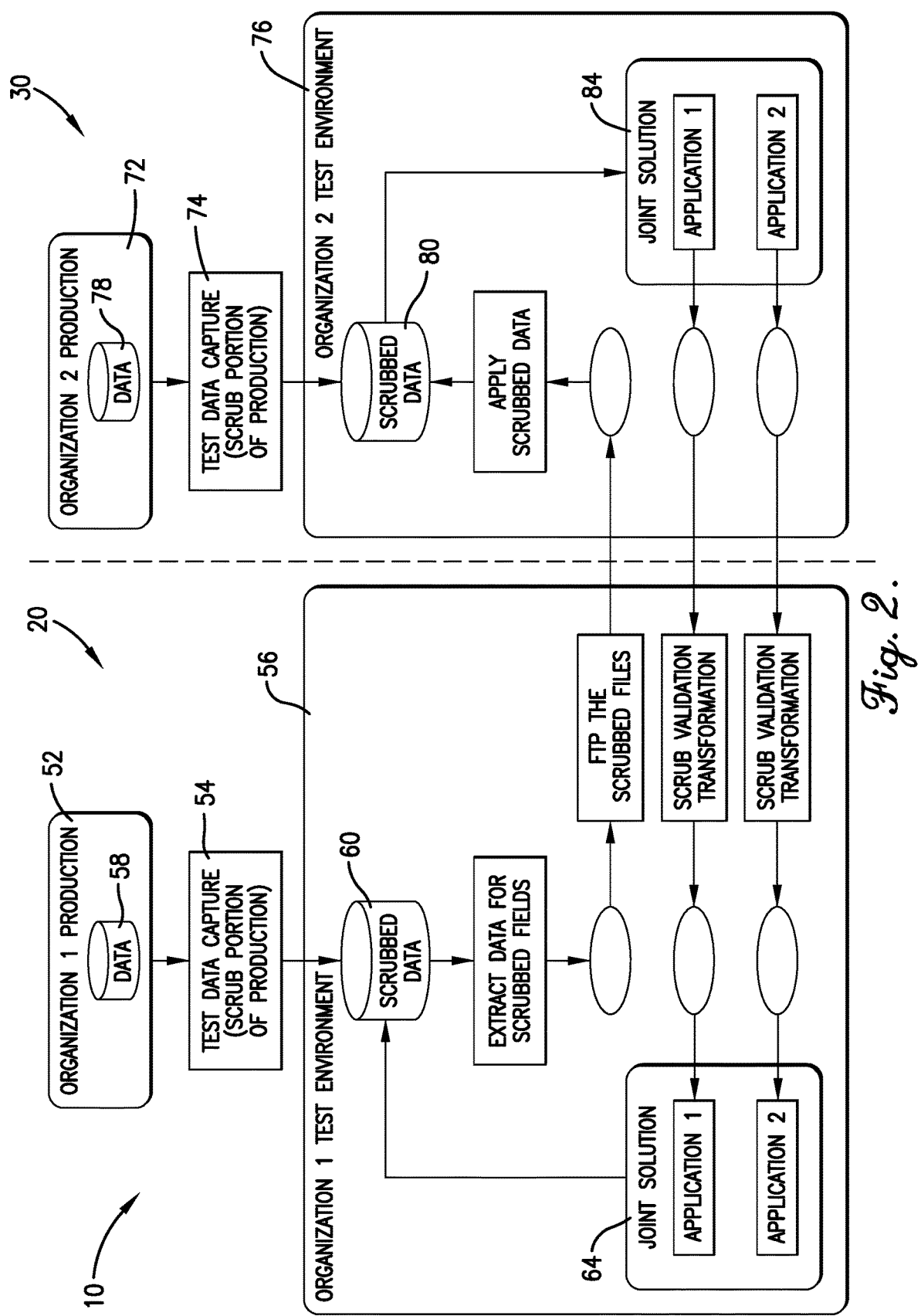
FIG. 2 is a block diagram of an exemplary embodiment of the system for scrubbing data to be shared between organizations and for preventing the introduction of unscrubbed data.
Figure 3:
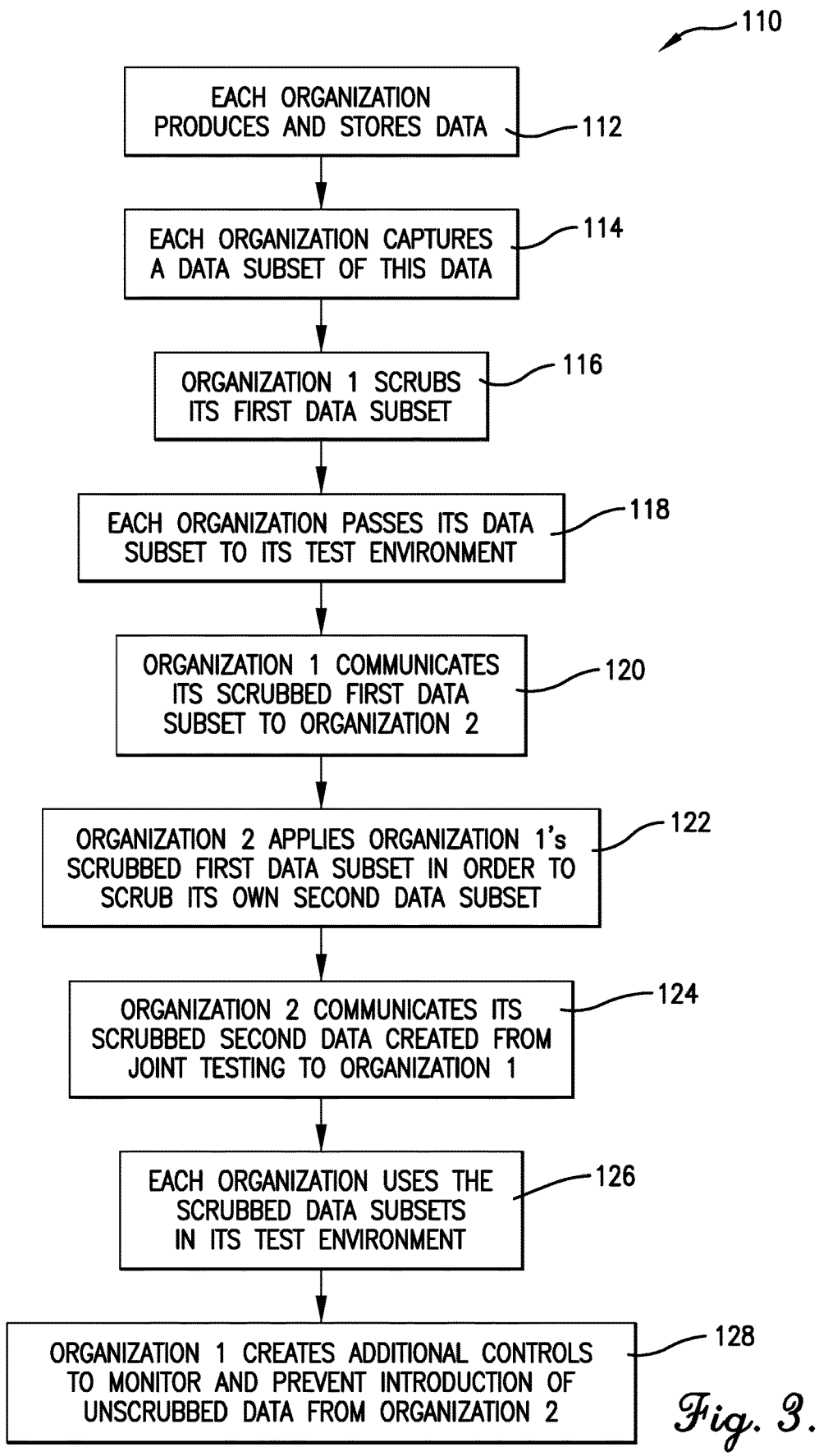
FIG. 3 is a flowchart of an exemplary embodiment of the method for scrubbing data to be shared between organizations and for preventing the introduction of unscrubbed data.

Referring to FIGS. 1, 2, and 3, a first organization, "Organization 1", may have certain first computing resources 20, such as a first electronic memory 22, a first electronic processor 24, and a first electronic communication element 26, and a second organization, "Organization 2", may also have certain second computing resources 30, such as a second electronic memory 32, a second electronic processor 34, and a second electronic communication element 36, with which embodiments of the system 10 and method 110 of the present invention may be implemented.

The computing resources 20,30 of the organizations may be configured to communicate with each other via a communication network 40.

The electronic memory elements 22,32 may be configured to store the data sets and data subsets discussed below. The memory elements 22,32 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The electronic processors 24,34 may be configured to execute embodiments of the functionality of the present invention, which may involve accessing the data stored in the memory elements 22,32, and communicating through the communication elements 26,36. The electronic communication elements 26,36 may be configured to communicate data via the communication network 40. According to some embodiments, the communication elements 26,36 may include one or more transceivers (e.g., WWAN, WLAN, and/or WPAN transceivers) functioning in accordance with IEEE standards, 3GPP standards, or other standards, and configured to receive and transmit data via one or more external ports. The communication network 40 may facilitate substantially any type of data communication via any standard or technology (e.g., GSM, CDMA, TDMA, WCDMA, LTE, EDGE, OFDM, GPRS, EV-DO, UWB, WiFi, IEEE 802 including Ethernet, WiMAX, and/or others). The network 40 may also support various local area networks (LANs), personal area networks (PAN), or short range communication protocols.

Referring also to FIG. 2, a block diagram of an embodiment of the system 10 of the present invention is shown for scrubbing data to be shared between organizations and for preventing the introduction of unscrubbed data. The system 10 may be implemented using the computing resources 20, 30 and communication network 40 shown in FIG. 1.

Broadly, Organization 1 may comprise a first data production component 52, a first data capture component 54, and a first test environment component 56. Similarly, Organization 2 may comprise a second data production component 72, a second data capture component 74, and a second test environment component 76. The data production components 52, 72 may be involved in the production and storage of data, such as customer data, associated with a line of business or other endeavor. The data capture components 54, 74 may be involved in capturing a data subset of the data produced and stored by the data production components 52, 72. The first data capture component 54 may scrub the subset of data for Organization 1 in accordance with established scrubbing rules. The test environment components 56, 76 are involved in implementing the environment in which one or more products, services, or other solutions are tested using the exchanged data.

In more detail, Organization 1 and Organization 2 may produce and store first and second data sets 58,78, which may include customer data associated with a line of business or other endeavor, at the first and second data production components 52,72. Each organization may then capture a data subset 60,80 of the larger data set 58,78 at the data capture components 54,74. Some or all of the captured data may be stored in the memory elements 22,32 until needed.

Organization 1 may scrub its first data subset 60 according to established scrubbing rules. In one implementation, this scrubbing may involve scrubbing specific data fields which are relevant to the purpose of exchanging the data subsets 60,80. Thus, rather than holistically scrubbing all of the data in test, scrubbing may be limited to a few data fields that impact or are otherwise relevant to the solution being tested, and this focus on a few data fields may allow for simplifying the scrubbing and monitoring process. Example data fields identified for scrubbing may include account number, date of birth, vehicle identification number, telephone number, address, social security number, and similar fields containing sensitive data. Scrubbing the data fields may include preserving the format of the data field and preserving any characters that have required meaning while replacing other characters that do not. This process of scrubbing Organization 1's first data subset 60 may be implemented by the first processor 24. Each organization may then pass its data subset 60,80 to its test environment 56,76 in which the one or more solutions are tested using the exchanged data. Organization 1 may then communicate its scrubbed first data subset to Organization 2 via the communication network 40. This may be facilitated by the first communication element 26.

Organization 2 may apply the scrubbed first data subset 60 received from Organization 1 in order to scrub its own second data subset 80. In particular, Organization 2 may not use Organization 1's scrubbing rules or scrubbing process to scrub its data, but rather uses Organization 1's actual scrubbed first data subset 60 in test to scrub its second data subset 80. This process of scrubbing Organization 2's second data subset 80 may be implemented by the second processor 34. Organization 2 may then communicate all or part of the scrubbed second data subset 80 after processing by the second test environment 84 to Organization 1 via the communication network 40 so that both organizations have both scrubbed data subsets. This may be facilitated by the second communication element 36. Each organization may then use the scrubbed first and second data subsets 60,80 in its own test environment 56,76 to test the one or more products, services, or other joint solutions 64,84.

Further, Organization 1 may create additional controls at one or more data integration points (whether real-time or non-real-time/batch) to monitor and prevent the introduction of unscrubbed data from Organization 2.

The system 10 may include more, fewer, or alternative components and/or perform more, fewer, or alternative actions, including those discussed elsewhere herein, and particularly those discussed in the following section describing the computer-implemented method.

II. Exemplary Computer-Implemented Method

Broadly, a computer program product in accordance with an embodiment of the present invention may include a computer usable storage medium (e.g., standard random access memory (RAM), an optical disc, a universal serial bus (USB) drive, or the like) having computer-readable program code embodied therein, wherein the computer-readable program code is adapted to be executed by the processors 24,26 to facilitate the functionality described herein. In this regard, the program code may be implemented in any desired language, and may be implemented as machine code, assembly code, byte code, interpretable source code or the like (e.g., via C, C++, Java, Actionscript, Objective-C, Javascript, CSS, XML).

Referring also to FIG. 3, an embodiment of the computer-implemented method 110 is shown for scrubbing organizations' data of sensitive information prior to exchanging it or otherwise making it externally available, such as when conducting joint testing or other actions, and to prevent the introduction of unscrubbed data into the organizations. The method 110 may be a corollary to the functionality of the system 10 of FIG. 2, and may be similarly implemented using the computing resources 20,30 and communication network 40 shown in FIG. 1.

Broadly, the method 110 may proceed substantially as follows. Organization 1 and Organization 2 may produce and store data sets 58,78, which may include such as customer data associated with a line of business or other endeavor, as shown in 112. Each organization may then capture a data subset 60,80 of this data, as shown in 114. Organization 1 may scrub its first data subset 60 according to established scrubbing rules, as shown in 116. In one implementation, this scrubbing may involve scrubbing specific data fields which are relevant to the purpose of exchanging the data subsets 60,80. Thus, rather than holistically scrubbing all of the data in test, scrubbing may be limited to a few data fields that impact integration testing, and this focus on a few data fields may allow for simplifying the scrubbing and monitoring process. Example data fields identified for scrubbing may include account number, date of birth, vehicle identification number, telephone number, address, social security number, and similar fields containing sensitive data. Scrubbing the data fields may include preserving the format of the data field and preserving any characters that have required meaning while replacing other characters that do not.

Each organization may then pass its data subset 60,80 to its test environment 56,76 in which one or more products, services, and/or solutions are tested using the exchanged data, as shown in 118. Organization 1 may communicate its scrubbed first data subset 60 to Organization 2, as shown in 120. Organization 2 may apply the scrubbed first data subset 60 received from Organization 1 in order to scrub its own second data subset 80, as shown in 122. In particular, Organization 2 may not use Organization 1's scrubbing rules or scrubbing process to scrub its data, but rather may use Organization 1's actual scrubbed first data subset 60 in test to scrub its own second data subset 80. Organization 2 may communicate all or part of the scrubbed second data subset 80 after processing by the second test environment 84 to Organization 1, as shown in 124, as part of the joint testing so that both organizations have both scrubbed data subsets 60,80. Each organization may use the scrubbed first and second data subsets 60,80 in its own test environment 56,76 to test the one or more solutions 64,84, as shown in 126.

Further, Organization 1 may create additional controls at one or more data integration points (whether real-time or non-real-time/batch) to monitor and prevent the introduction of unscrubbed data from Organization 2, as shown in 128.

Typically, monitoring and detective controls operate at the back end of a process at regular intervals to detect and address any exposure of sensitive data in the environment. The present invention may integrate the detective and preventative controls in the actual software solution without affecting or impacting the actual solution code.

Embodiments of the present invention may not only detect any unscrubbed data entering into the test, but may also scrub the detected unscrubbed data to prevent exposure of sensitive data. In one implementation, data may be scrubbed at the entry point if the preventative controls determine that unscrubbed data is entering the test environment. However, it still retains the effectiveness of testing by retaining the data integrity and business process usability of the test data, with the test efforts following a few data guidelines for test data setup.

The computer-implemented method may include more, fewer, or alternative actions, including those discussed elsewhere herein.

III. Exemplary Computer-Readable Medium

Referring again to FIG. 3, an exemplary non-transitory computer-readable medium with an executable program stored thereon for scrubbing organizations' data of sensitive information prior to exchanging it or otherwise making it externally available, such as when conducting joint testing or other actions, and to prevent the introduction of unscrubbed data into the organizations. The executable program stored on the computer-readable medium may broadly instruct the computing resources 20,30, including the memory elements 22,32, the processors 24,34, and the communication elements 26,36, to perform the following actions.

Organization 1 and Organization 2 may produce and store data sets 58,78, which may include such as customer data associated with a line of business or other endeavor, as shown in 112. Each organization may then capture a data subset 60,80 of this data, as shown in 114. Organization 1 may scrub its first data subset 60 according to established scrubbing rules, as shown in 116. In one implementation, this scrubbing may involve scrubbing specific data fields which are relevant to the purpose of exchanging the data subsets 60,80. Thus, rather than holistically scrubbing all of the data in test, scrubbing may be limited to a few data fields that impact integration testing, and this focus on a few data fields may allow for simplifying the scrubbing and monitoring process. Example data fields identified for scrubbing may include account number, date of birth, vehicle identification number, telephone number, address, social security number, and similar fields containing sensitive data. Scrubbing the data fields may include preserving the format of the data field and preserving any characters that have required meaning while replacing other characters that do not.

Each organization may then pass its data subset 60,80 to its test environment 56,76 in which one or more products, services, and/or solutions are tested using the exchanged data, as shown in 118. Organization 1 may communicate its scrubbed first data subset 60 to Organization 2, as shown in 120. Organization 2 may apply the scrubbed first data subset 60 received from Organization 1 in order to scrub its own second data subset 80, as shown in 122. In particular, Organization 2 may not use Organization 1's scrubbing rules or scrubbing process to scrub its data, but rather may use Organization 1's actual scrubbed first data subset 60 in test to scrub its own second data subset 80. Organization 2 may communicate all or part of the scrubbed second data subset 80 after processing by the second test environment 84 to Organization 1, as shown in 124, so that both organizations have both scrubbed data subsets 60,80. Each organization may use the scrubbed first and second data subsets 60,80 in its own test environment 56,76 to test the one or more products, services, or other joint solutions 64,84, as shown in 126.

Further, Organization 1 may create additional controls at one or more data integration points (whether real-time or non-real-time/batch) to monitor and prevent the introduction of unscrubbed data from Organization 2, as shown in 128.

The one or more executable programs stored on the non-transitory computer-readable medium may instruct the system to perform more, fewer, or alternative actions, including those discussed elsewhere herein, and particularly those discussed in the section describing the computer-implemented method.

IV. Exemplary Embodiments

The present embodiments include systems and methods to scrub external company data for joint testing and prevent introduction of unscrubbed data into a test environment. As an example, Companies A and B may capture the necessary data (such as jointly agreed upon data) from their production and send the data into their integration test environments using their existing data capture processes in test. Company A may then produce data files with scrubbed data fields which are critical for integration testing. As part of the environment data setup, Company A may transfer the scrubbed data files to Company B, who in turn may apply the Company A scrubbed data values within Company B's integration test environment. Test data may be scrubbed and sync'd in both Company A and B's integration test environments prior to the integration testing. In addition, Company A may establish additional controls at necessary integration points (both real time and non-real time/batch) to monitor and prevent introduction of unscrubbed data into Company A's test environment from Company's B test environment.

The present embodiments, may provide a unique way to manage the data scrubbing differences in test between two different companies when they involve integration testing the tightly integrated solutions. The solution to scrub the external company data (e.g., Company B's data) using Company A's scrubbed data in test may not use the actual enterprise scrubbing rules or scrubbing process to scrub the external company (Company B) data, but rather leverages scrubbed data in the testing environment for scrubbing. The solution allows data to be scrubbed similarly in both companies' computer systems to facilitate testing in a shared test environment, or in each company's individual test environment, such as concurrent or simultaneous testing.

Instead of holistically scrubbing all the sensitive data fields in Company B's test environment, the solution may be able to narrow the fields to be scrubbed down to only a few that impact integration testing. Using a reduced number of fields may simplify the scrubbing and monitoring solution.

Usually, monitoring or detective controls work in the back end at regular intervals to detect or address any sensitive data exposure in the environment. Whereas this solution integrates the detective and preventive controls to the actual software solution without touching/impacting the actual solution code. As part of the preventive controls, this process may scrub the data at the entry point it if notices any unscrubbed data is being entered into the test environment. However, it still retains the effectiveness of testing (retaining the data integrity and business process usability of the test data) with little overhead of having the test efforts to follow few data guidelines for test data setup. The solution not only detects the unscrubbed data being entered into the test, it also scrubs the data to prevent any sensitive data exposure.

The solution provides an efficient solution to develop, implement and maintain compared to other enterprise options to manage this problem. The solution also eliminates the potential impacts to an enterprise scrubbing solution.

IV. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor implemented. For example, at least some of the operations of a method may be performed by one or more processors or processor-implemented hardware modules. The performance of certain operations may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some exemplary embodiments, the one or more processors or processor implemented modules may be located in a single geographic location (e.g., within a home environment, an office environment, or a server farm). In other exemplary embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to property insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; pert insurance, personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" may be used interchangeably herein to refer to a person, party, or entity (e.g., a business or other organizational entity) that is covered by the insurance policy, e.g., whose insured article or entity (e.g., property, life, health, auto, home, business) is covered by the policy.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

We claim:

1. A computer-implemented method for scrubbing data to be shared between a first organization and a second organization for testing a joint solution or conducting joint testing, wherein the first organization produces a first data set and the second organization produces a second data set, the method comprising:
    capturing, by the first organization, a first data subset of the first data set in a first electronic memory of the first organization;
    capturing, by the second organization, a second data subset of the second data set in a second electronic memory of the second organization;
    scrubbing, by a first electronic processor of the first organization, the first data subset according to scrubbing rules of the first organization;
    transmitting, by a first electronic communication element of the first organization, the scrubbed first data subset from the first organization to the second organization via an electronic communication network;
    scrubbing, in response to a transmission of the scrubbed first data subset and by a second electronic processor of the second organization, the second data subset based on the scrubbed first data subset;
    transmitting, by a second electronic processor of the second organization, at least part of the scrubbed second data subset from the second organization to the first organization as part of the joint testing; and
    testing, in response to a transmission of the at least part of the scrubbed second data subset and by the first organization, the joint solution using the scrubbed first and second data subsets in a first test environment provided by the first organization; and
    testing, by the second organization, the joint solution using the scrubbed first and second data subsets in a second test environment provided by the second organization.

2. The computer-implemented method as set forth in claim 1, wherein the data is customer data associated with a business endeavor.

3. The computer-implemented method as set forth in claim 1, wherein scrubbing the first data subset involves scrubbing only one or more specific data fields.

4. The computer-implemented method as set forth in claim 3, wherein the one or more specific data fields contain sensitive information.

5. The computer-implemented method as set forth in claim 4, wherein the one or more specific data fields are selected from the group consisting of: account numbers, dates of birth, vehicle identification numbers, telephone numbers, addresses, social security numbers, and personal identification numbers.

6. The computer-implemented method as set forth in claim 3, wherein scrubbing the one or more specific data fields includes preserving a format of each of the one or more specific data fields.

7. The computer-implemented method as set forth in claim 3, wherein scrubbing the one or more specific data fields includes preserving one or more characters which are relevant to testing the joint solution while replacing other characters in the one or more specific data fields.

8. The computer-implemented method as set forth in claim 1, further including creating by the first organization an additional control at a data integration point to identify and prevent the introduction of unscrubbed data communicated by the second organization.

9. A computer-implemented method for scrubbing data to be shared between a first organization and a second organization for testing a joint solution or conducting joint testing, wherein the first organization produces a first data set of customer data associated with a business endeavor, and the second organization produces a second data set of customer data associated with the business endeavor, the method comprising:
    capturing, by the first organization, a first data subset of the first data set in a first electronic memory of the first organization;
    capturing, by the second organization, a second data subset of the second data set in a second electronic memory of the second organization;
    scrubbing, by a first electronic processor of the first organization, the first data subset according to scrubbing rules of the first organization, wherein scrubbing the first data subset involves scrubbing only one or more specific data fields which contain sensitive information, and wherein scrubbing the one or more specific data fields further includes preserving a format of each of the one or more specific data fields and preserving one or more characters which are relevant to testing the joint solution while replacing other characters in the one or more specific data fields;

transmitting, by a first electronic communication element of the first organization, the scrubbed first data subset from the first organization to the second organization via an electronic communication network;

scrubbing, in response to a transmission of the scrubbed first data subset and by a second electronic processor of the second organization, the second data subset based on the scrubbed first data subset;

transmitting, by a second electronic processor of the second organization, at least part of the scrubbed second data subset from the second organization to the first organization as part of the joint testing;

testing, in response to a transmission of the at least part of the scrubbed second data subset and by the first organization, the joint solution using the scrubbed first and second data subsets in a first test environment provided by the first organization; and testing, by the second organization, the joint solution using the scrubbed first and second data subsets in a second test environment provided by the second organization.

10. A system for scrubbing data to be shared between a first organization and a second organization for testing a joint solution or conducting joint testing, wherein the first organization produces a first data set and the second organization produces a second data set, the system comprising:

a first electronic memory of the first organization configured to capture a first data subset of the first data set;

a first electronic processor of the first organization configured to scrub the first data subset according to scrubbing rules of the first organization;

a first electronic communication element of the first organization configured to communicate via an electronic communication network the scrubbed first data subset from the first organization to the second organization;

a second electronic memory of the second computing resource configured to capture a second data subset of the second data set;

a second electronic processor of the second organization configured to scrub the second data subset based on the scrubbed first data subset received from the first organization; and a second electronic communication element of the second organization configured to communicate via the electronic communication network at least part of the scrubbed second data subset from the second organization to the first organization as part of the joint testing, wherein the first electronic processor is further configured to use the scrubbed first and second data subsets in a first test environment provided by the first organization to test the joint solution, and the second electronic processor is further configured to use the scrubbed first and second data subsets in a second test environment provided by the second organization to test the joint solution.

11. The system as set forth in claim 10, wherein the data is customer data associated with a business endeavor.

12. The system as set forth in claim 10, wherein scrubbing the first data subset involves scrubbing only one or more specific data fields.

13. The system as set forth in claim 12, wherein the one or more specific data fields contain sensitive information.

14. The system as set forth in claim 13, wherein the one or more specific data fields are selected from the group consisting of: account numbers, dates of birth, vehicle identification numbers, telephone numbers, addresses, social security numbers, and personal identification numbers.

15. The system as set forth in claim 12, wherein scrubbing the one or more specific data fields includes preserving a format of each of the one or more specific data fields.

16. The system as set forth in claim 12, wherein scrubbing the one or more specific data fields includes preserving one or more characters which are relevant to testing the joint solution while replacing other characters in the one or more specific data fields.

17. The system as set forth in claim 10, wherein the first computing resources are further configured to implement an additional control at a data integration point to identify and prevent the introduction of unscrubbed data communicated by the second organization.

* * * * *